United States Patent

[11] 3,602,728

| [72] | Inventor | Virgil R. Carpenter<br>Roseville, Minn. |
|---|---|---|
| [21] | Appl. No. | 861,764 |
| [22] | Filed | Sept. 29, 1969 |
| [45] | Patented | Aug. 31, 1971 |
| [73] | Assignee | Frank X. Dubay<br>Mound, Minn. |

[54] REMOTE CONTROL SWITCHING APPARATUS
14 Claims, 2 Drawing Figs.

[52] U.S. Cl. .................................................... 307/140,
191/12.2
[51] Int. Cl. ....................................................... H01h 3/00
[50] Field of Search ............................................ 307/140,
114, 139, 141.8, 143, 11, 38, 136; 191/12.4, 12.2

[56] References Cited
UNITED STATES PATENTS

| 2,213,384 | 9/1940 | Conwell et al. | 307/140 |
| 2,266,851 | 12/1941 | Conwell et al. | 307/140 |
| 2,755,424 | 7/1956 | Papitto | 307/141.8 X |
| 3,193,710 | 7/1965 | Elliot | 307/136 |
| 3,309,542 | 3/1967 | Elliot | 307/136 |

*Primary Examiner*—Milton O. Hirshfield
*Assistant Examiner*—Ulysses Weldon
*Attorney*—Dugger, Peterson, Johnson & Westman ABSTRACT: An electrically operated tool or machine that is connected by a pair of powerlines one of which is grounded, and a ground line to a first source of power, a switch and a second source of power connected to the grounded powerline and the ground line adjacent the tool or machine, a coil in the ground line adjacent the first source of power, a switch operated to a closed position by the energization of the coil to complete a circuit to energize through said powerlines, an electrically operated device which is adjacent the first power source. The coil is energized by completing a circuit from the second power source to the ground line. The device may be, for example, a signal light or power-operated reel. In a second embodiment there is provided a second coil and switch operated by energization of the coil to a closed position and the device has two electrical operated components or is for example a reversible motor.

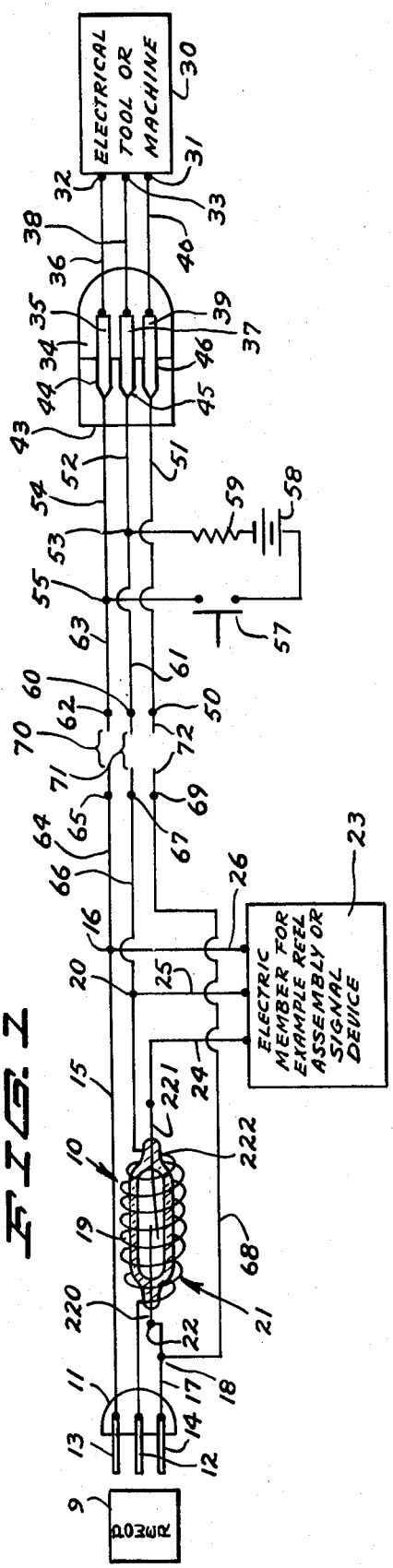
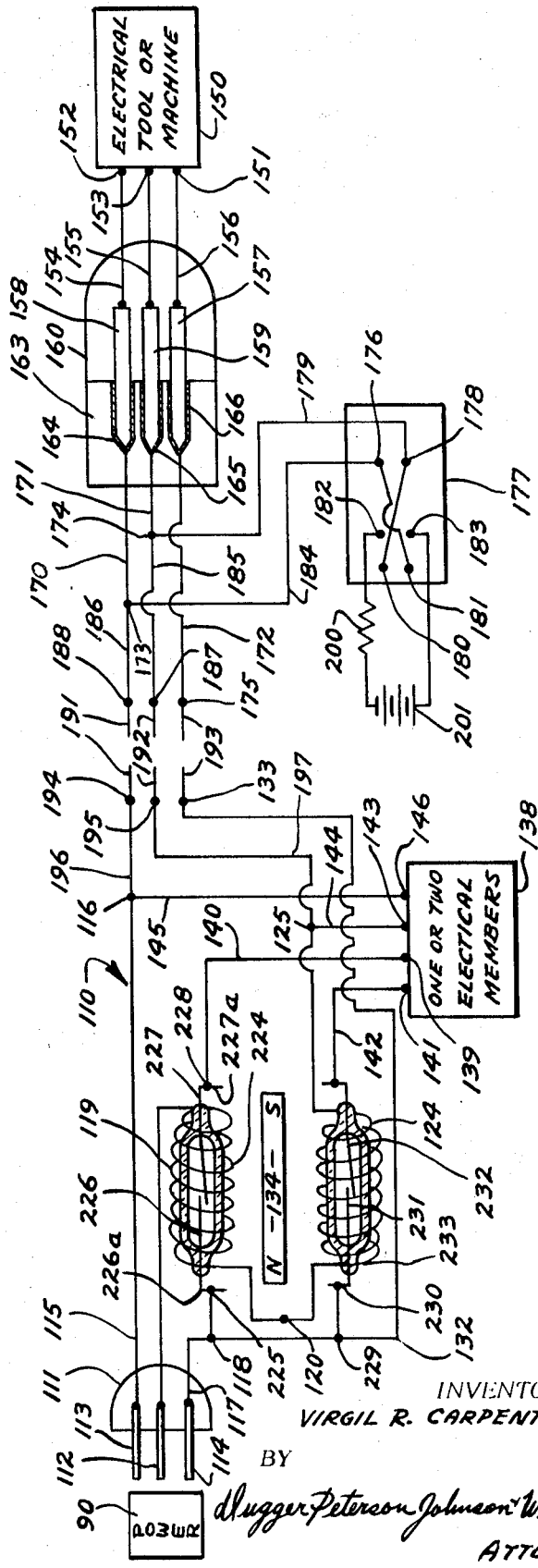

3,602,728

REMOTE CONTROL SWITCHING APPARATUS

BACKGROUND OF THE INVENTION

This invention relates to providing electrical switching apparatus wherein the switch member is located adjacent an electrically powered first member that may be located at a location remote from a second electrically powered member, the switch member being located adjacent the first member and being provided to control the application of power through powerlines to a second member.

In the prior art, it is old to provide an electrically powered member such as a lawn mower that is electrically connected through a power cord line to a source of electric power, for example, an electric outlet on a building. Further it is old to provide an electrically operated device, for example, a reel assembly to wind an electric power cord. However, when it is desired to activate the reel assembly to rewind or partially rewind the cord, it is necessary to walk from an electrically powered member to adjacent the reel assembly. This may be a matter of a few feet or hundreds of feet. In order to be able to control the actuation of the electric device at the location of the electrically powered member, this invention has been made. Another feature of this invention is to minimize the number of electric lines that are required to achieve the actuation of an electrical device from another electrically powered member which may be moved remote to the device, and also still have a ground line from said member to the source of power.

An objective of this invention is to provide new and novel apparatus for controlling the actuation of an electrically powered device from a remote location at or adjacent to another electrically powered member. Another object of this invention is to provide new and novel apparatus for controlling the selective actuation of two different electric devices, or at least two different functional operations of the same device from a remote location at or adjacent to an electrically operated member. In furtherance of the above objects, it is a further object of this invention to provide new and novel switching apparatus in and connected to the power lines between a source of electrical power and the electrically operated device and the electrically operated member.

SUMMARY OF THE INVENTION

An electrically powered member, for example a lawn mower, a floor maintenance machine, a hand tool, a drill or electric weld rod holder or etc. connected through a number of lines to a source of power, and that is movable to a location remote to said power source, an electrical device, for example a signal device such as an electric light or horn, a reel motor, a reel motor and a brake or etc. that are connected and/or connectable across two or more of said powerlines at a location adjacent the source, and switching mechanism connected across two or more of the powerlines adjacent said electrically operated member for controlling the energization of said device.

BRIEF DESCRIPTION OF THE DRAWINGS

FIG. 1 is a schematic showing of the first embodiment of the invention, the housing for the reed-type switch being shown in cross section, and FIG. 2 is a schematic showing of the second embodiment of the invention with the housings for the reed-type switches being shown in cross section.

DESCRIPTION OF THE PREFERRED EMBODIMENTS

Referring now to Figure 1, the first embodiment of the invention, generally designated 10, including an electrical plug 11 that is adapted to be plugged into a conventional source of power such as an outlet on a building. The source of power and source of power 90 of the second embodiment may be from a public utility, for example, 110 volts, 60-curve alternating current which has one powerline grounded. This is to be distinguished from the ground line referred to hereinafter. The plug 11 includes a ground prong 12 and prongs 13 and 14. A line 15 connects prong 13 to junction 16 while a line 17 connects prong 14 to a junction 18 that in turn is connected by a line to junction 22. A coil 19 is electrically connected between prong 12 and a junction 20. A reed-type switch, generally designated 21, is extended through the coil and has a pair of elongated contact members 220, 221 that have overlapping one end portions within the sealed, evacuated chamber of the nonmagnetic housing 222. The contact members which are partly of, or completely of, magnetic material, through their resilience remain in an open condition until a current is passed through the coil, and upon passage of current through the coil, move to a closed position. The opposite end of contact 220 is connected to junction 22 while the opposite end of contact 221 is connected by a line 24 to an electrically operated member 23. As will be more fully set forth, member 23 may be, for example, a horn, a light, a motor or another type of an electrically operated member. Line 25 electrically connects junction 20 to member 23 while line 26 connects member 23 to junction 16. Thus lines 24, 26 are electrically connected to power terminals of member 23 while line 25 is connected to the ground terminal of member 23.

An electrically operated machine or tool 30 has power terminals 31, 32 and a ground terminal 33. Member 30 may be an electrically powered mobile machine such as a lawn mower or sweeping machine, or a hand drill, or an electric weld rod holder, or etc. that in use is moved from one place to another.

A male plug 34 has a prong 35 electrically connected by a line 36 to terminal 32, a prong 37 electrically connected by a line 38 to terminal 33 and a prong 39 electrically connected by a line 40 to terminal 31. A female plug 43 has sockets 44, 45 and 46 to receive prongs 35, 37 and 39 respectively; line 51 electrically connecting socket 46 to junction 50, line 52 electrically connecting socket 45 to junction 53 and line 54 electrically connecting socket 44 to junction 55. An on-off switch 57, a source of power 58, for example a 6-volt battery, and a resistor 59 are connected in series across junctions 53, 55. Junction 55 is connected by line 63 to junction 62 and junction 53 is connected by line 61 to junction 60.

Junction 16 is connected by a line 64 to junction 65; junction 20 is connected by a line 66 to junction 67; and junction 18 is connected by a line 68 to junction 69. Line 70 connects junctions 62, 65; line 71 connects junctions 60, 67; and line 72 connects junctions 50, 69. Under conventional color coding, line 15, 64, 70, 63, 54, 36, 26 is the white line; line 17, 68, 72, 51, 40 is the black line; and line 66, 61, 52, 38, 25 and which connects coil 19 to junction 20 is the green line.

Referring now to Figure 2, the second embodiment of the invention generally designated 110, includes an electrical plug 111 that is adapted to be plugged into a conventional source of power. The plug 111 includes a ground prong 112 and prongs 113, 114; lines 115 and 117 respectively electrically connecting prong 113 to junction 116 and prong 114 to junction 118. A coil 119 is electrically connected between prong 112 and junction 120 while an oppositely wound coil 124 electrically connects junction 120 to junction 125. A line electrically connects junction 118 to a junction 225 that is on leg 226a of the contact member 226 of the reed type switch 224, switch 224 extending through coil 119. Switch 224 has a second contact member 227 with a leg 227a, the legs 226a 227a extending generally at right angles to the main body portions of the contact members and generally toward the adjacent end of the permanent magnet 134. A junction 228 is provided on leg 227a.

A line 132 electrically connects junction 118 to junction 133, a junction 229 on line 132 being connected to a junction on the leg of contact member 231 of the reed-type switch 233 which is extended through coil 124. The switch 233 includes a second contact member 232 that has a leg, the legs of contact members 231, 232 extending generally at right angles to the main body portions of said members and toward the adjacent ends of the magnet 134. The coils have generally parallel coil axes that are on opposite sides of the magnet 134. Switches 224, 233 advantageously are of the same construction as switch 21, other than without the permanent magnet the passage of current through the respective coil does not close the contact members and it is preferable to provide the legs on switches 224, 233 as above described. The legs serve to strengthen or aid the magnetic field of magnet 134 and one coil when the current flow is in one direction and of the other coil when the current flow is in the other direction. Switches 224, 233 are of the type that the adjacent ends of the respective sets of contact members are open when the coils are deenergized.

The permanent magnet 134 which is provided between coils 119, 124 partially cancels the effect of one coil tending to move the contact members of the switch therein to a closed position and aids the other coil in moving the contact members of the coil extended therethrough when the current flows through the coils in one direction; but when the current flow is in the opposite direction, aids the one and cancels the effect of the other. The magnet provides, for example, about 40 percent strength of what is required to move the contact members of the reed-type switch of the coil it is aiding to a closed position, this result being obtained, for example, by providing a magnet of a sufficient size to accomplish this effect or a sufficient air gap between the coils and the magnet. However the magnet is not of a strength to cause either set of contact members to a closed position when the coils are deenergized. Further, as to the reed-type switch that the magnet cancels the effect of the field of the respective coil, when the coil is energized, the contact members thereof will not be moved to a closed condition. Also with no magnet 134, the contact members of switches 224, 233 will not move to a closed position with the passage of current through the respective coil.

The junction 228 is connected by a line 140 to terminal 139 of an electrically operated member or members 138 while the junction on the leg of contact member 232 is electrically connected by a line 142 to terminal 141 of member 138. Member or members 138 has a terminal 143 that is electrically connected by a line 144 to junction 125 and a terminal 146 that is connected by a line 145 to junction 116.

An electrically operated machine tool 150 of the same type as machine 30 has power terminals 151, 152 and a ground terminal 153 that are respectively connected by lines 156, 154, 155 to prongs 157, 158, 159 of the male plug 160. Prong 159 is the ground prong. A female plug 163 has sockets 164, 165, 166 to receive prongs 158, 159, 157 respectively; the sockets being connected by lines 170, 171, 172 respectively to junctions 173, 174, 175.

Line 184 connects junction 173 to the first pole 176 of a three-position, double-pole, double-throw switch 177 while a second pole 178 is connected by line 179 to junction 174. Pole 176 is connected by a line to terminal 181 while pole 178 is connected by a line to terminal 180 of said switch, the switch also having terminals 182, 183. When the switch is in "off" position, terminals 183, 183 are not electrically connected to any of members 177—181; in a second position, terminal 182 is electrically connected to pole 176 and terminal 183 electrically connected to terminal 178; and in the third position, terminal 182 is electrically connected to member 180 and terminal 183 is electrically connected to member 181. A D C source of power 201 and resistor 200 are connected in series across terminals 182, 183.

Lines 185, 186 respectively connect junctions 174 to junction 187 and junction 173 to junction 188. Lines 191, 192, 193 respectively electrically connect junctions 188 and 194; 187 and 195; and 175 and 133. Junction 194 is connected by line 196 to junction 116; junction 195 being connected by line 197 to junction 125.

Each of the coils 19, 119, 124 are of low resistance, for example 120-160 turns of 14 or 16 gauge wire, while with the structure described, the contact members of the reed switch of the respective coil may be moved to a closed condition by passage of, for example, 3/4 amp. through the respective coil. As a result, even if a short should occur in one of the power lines, the function of the ground line is not impaired to any significant extent to create a dangerous shock hazard. For example if line 40 were shorted to line 38, the fuse normally provided between prong 14 and source 9 would blow and there would be at most only a very low voltage drop as a result of the power source 9 across coil 19.

Plugs 11, 111 may be of a two prong variety with a ground line to be grounded through the outlet box in place of the third prong; or in place of plugs 11, 111, the respective wire may be connected directly to a three line power source through suitable junctions. Also, source of power 58, 201 may be A C sources with suitable rectifiers to provide an unidirectional flow of current. In any event the power sources are low-voltage sources, for example, 6 volts, while resistors 59, 200 are provided to limit the amperage of the current flow.

As an example of connecting a reel assembly in the circuit of Figure 1 and referring to, for example, U. S. Pat. No. 3,033,488, the junctions 65, 67, 69 of this application would represent the collector assembly of said patent with lines 64, 66, 69 of this application being connected to the input connection terminal of said assembly and the lines 70, 71, 72 being connected to the collector conductors and collector rings of said assembly. Further an electric motor that is connected to lines 24, 25, 26 would be substituted for the spring motor means of U.S. Pat. No. 3,033,488. Similarly, the junctions 194, 195, 133 would represent the collector assembly of the above mentioned reel assembly in Figure 2 of this application.

In using the first embodiment of the invention with terminals 32 and 31 respectively connected to prongs 13 and 14, terminal 33 electrically connected to prong 12 and plug 11 plugged into a suitable source of power, which may be the outlet box connected to public utility powerlines, power is provided at the electrically operated machine or tool 30. A suitable "on-off" switch not shown may be provided between terminals 31, 32 and the electric motor not shown of member 30. For purposes of further facilitating the understanding of the invention, it will be assumed that member 30 is an electrically operated lawn mower or a floor maintenance machine; and that member 23 is an electrically operated reel assembly for winding the cord 70, 71, 72 but allows the cord to unwind upon pulling on the cord. In this instance, the switch 57 and battery 58 would be positionably or removably connected to the frame of machine 30. As the machine is moved away from member reel assembly 23, the cord 70, 71, 72 is unwound. When it is desired to rewind the cord, switch 57 is closed, thus completing a circuit through line 63, 70, 64, 15; prongs 12, prong 13 and lines 66, 61 to energize coil 19. Energizing coil 19 moves contact members 220, 221 to establish an electrical connection between junction 18 and line 24 whereby prong 14 is electrically connected to line 24 to, through lines 24, 26, energize the motor not shown of member reel assembly 23 to wind the cord 70, 71, 72. When the cord has been sufficiently rewound, the switch 57 is opened to deenergize coil 19. As a result, contact members 220, 221 resiliently return to an open condition whereby member 23 is deenergized.

As another example, member 30 may be an electrically hand operated tool, for example, a power drill and member 23 a signal device, for example, an electric light or an electrical horn. Then upon closing switch, a signal would be provided by 23. In this connection it might be mentioned that lines 70, 71, 72 may be several hundred feet long, the source of power 58 being only sufficient to operate the coil 19 as mentioned above.

As a result of this invention, only very low voltage, low current is carried by lines 52, 71, 66 when the switch 57 is closed. However, this is not sufficient to interfere with the safety purpose of providing the lines that provide a ground connection from prong 12 to the terminal 33 which in turn is connected to the frame of member 30 to maintain the frame thereof at ground potential. That is if, for example, line 40 is shorted to the frame of member 30, the fuse not shown normally provided in the powerlines would blow as coil 19 does not provide sufficient A C resistance to impair the safety function of the ground line.

For purposes of describing the second embodiment of the invention, it will first be assumed that member 150 is an electrically powered lawn mower or floor maintenance machine of the type described with reference to member 30, and the switch 177 and power source 201 are mounted on or mountable on member 150 and thus adjacent member 150. Further it will be assumed that member 138 is a reel assembly having a reversible motor that is driven in one direction unwind when prongs 113, 114 are electrically connected to terminals 146, 141 but driven in the other direction winding direction when said prongs are electrically connected to terminals 146, 139. Now with the plug 111 plugged into a suitable source of power, and switch 177 is in an "off" position, no electrical connection is provided between prong 114 and terminal 141 or terminal 139. Upon operating switch 177 to electrically connect terminal 182 to member 180, and terminal 183 to member 181, current from source 201 flows in one direction through coils 119, 124 to energize said coils. The current flowing in this one direction acts through coil 124 to move contact 231 to establish an electrical connection with contact 232, the magnet 134 reinforcing the strength of the field of coil 124 to move the contacts 231, 232 to make this electrical connection. At the same time the current flowing in said one direction through coil 119 tends to move contacts 226, 227 to a closed position, however, the effect of the field of coil 119 being partially cancelled by the magnet 134 results in contacts 226, 227 remaining in an open condition. As a result, prong 114 is electrically connected to terminal 141 whereby the motor of reel 138 turns the reel in an unwinding direction. Upon again moving the switch 183 to an "off" position, coils 119, 124 are deenergized and contact members 231, 232 resiliently return to their open position while contact members 226, 227 remain in an open condition whereby power is no longer applied across terminals 141, 146.

When the switch is moved to its second "on" position, terminals 182, 183 are respectively electrically connected to poles 176, 178 whereby the current flow through coils 119, 124 is in a direction opposite that referred to in the preceding paragraph. As a result, the field of coil 124 is partially cancelled by the magnet and thus contact members 231, 232 remain open and the energization of coil 119 results in contact members 226, 227 moving to establish an electrical connection between junctions 118, 228, the magnet reinforcing the field of coil 119 to move contact members 226, 227 to a closed position. As a result terminal 139 is electrically connected to prong 114 whereby the motor of reel 138 turns in a cord-winding direction. Upon operating the switch 177 to an "off" position, coils 119, 124 are deenergized and neither terminal 139 nor 141 is electrically connected to prong 114.

Member 138 instead of being a reel assembly having a reversible motor, may be a reel or another type of power driven member having an electrically operated clutch connected across terminals 141, 143 and 146; and an electrically operated brake connected across terminals 139, 143, 146. In this case, moving the switch 177 to an "on" position would actuate the brake and in the other position actuate the clutch. If member 138 were a reel, actuation of the brake would prevent rotation of the reel while actuation of the clutch would permit free rotation of the reel. As another example, member 138 may have a power driven device that is driven when the clutch is actuated, and when the brake is actuated, the movement of the device is stopped. As still another example, member 138 may be a signal light of one color connected across terminals 141, 143, 146 and a second signal light of a second color connected across terminals 139, 143, 146.

Further, it is not essential to this invention that plugs 43, 34, 163, 160 provided, rather wires may be directly connected in place of plug connections, or for example, a continuous length of wire may be substituted for lines 36, 54, socket 44 and prong 35. Additionally, lines 70, 71, 72 may form part of an extension cord having a first plug end to be electrically connected through a plug end of lines 64, 66, 68 at junctions 65, 67, 69 and a second plug end at junctions 62, 60, 50. In a similar manner lines 191, 192, 193 may be part of an extension cord.

With this invention, where three lines are utilized for connecting the source of power to a machine or tool that is moved from one location to another without being disconnected from the source of power, the same three lines are utilized in the circuitry for controlling the actuation of another machine or device from, or adjacent to, the first-mentioned machine or tool without requiring the provision of extra lines extending from the first mentioned machine or tool or a switch adjacent to or on the first-mentioned machine or tool to the second machine or device.

What is claimed is:

1. Electrical apparatus operably receiving power from an electric power source comprising a first electrically powered member adjacent the power source, a second electrically powered member movable from adjacent the first member to a location remote therefrom, electric line means for connecting the source of power to each of the first and second members, said line means including first, second and third lines connected at one end to said power source and at their other end to said second member, said first and second lines constituting ground lines, and switching means at least in part forming a part of said line means including a first switch connected between the third line and said first member for selectively energizing said first member from said power source and deenergizing said first member therefrom, said first member also being connected to said first line, said switching means further including a second switch connected between said first and second lines adjacent said second member and movable therewith to the remote location for controlling said first switch and thus the energizing and deenergizing of the first member.

2. The apparatus of claim 1 further characterized in that said switching means includes a coil adjacent the power source that forms a part of the second line, and said first switch operating through the energization of said coil to establish an electrical connection between the third line and the first line and alternately breaking the last-mentioned electrical connection upon the deenergization of the coil.

3. The apparatus of claim 2 further characterized in that said coil is of relatively heavy gauge low-resistance wire.

4. The apparatus of claim 2 further characterized in that said first member comprises an electrically operated signal device.

5. The apparatus of claim 2 including a second power source adjacent the second member and in series with said second switch, closure of said second switch supplying control power for said first switch to close said first switch to establish the electrical connection between the third and first lines.

6. Apparatus for connecting a first source of electrical power to a first electrically operated member operable at a location remote from the source of power and a second electrically operated member adjacent the source of power, and controlling the energization of the second member from said first power source, comprising first, second and third lines for connecting the first source of power to the first member, a fourth line electrically connected o said first line adjacent the first source of power and to said second member, a fifth line electrically connected to said second line and said second member adjacent said first power source, said third line having operable cooperating means for establishing an electrical connection between the third line and said first line through said second member adjacent the power source and alternately breaking the last-mentioned electrical connection through said second member, and operable second means between said first and second lines and adjacent the first member for selectively operating the cooperating means between an electrical connection condition and a condition that the last-mentioned electrical connection is broken.

7. The apparatus of claim 7 further characterized in that said cooperating means for establishing an electrical connection between the third line and said first line includes a pair of switch contacts connected between said third line and said second member operable between a first position providing an open connection to said second member and a second position establishing a closed electrical connection to said second member.

8. The apparatus of claim 9 further characterized in that the cooperating means for establishing an electrical connection between the third and first lines includes coil means in the second line for operating the pair of switch contacts from their said second position.

9. The apparatus of claim 10 further characterized in that said second means for selectively operating means includes an on-off switch and a second power source connected in series with the switch of said second means for selectively operating the cooperating means between the first and second lines.

10. The apparatus of claim 10 further characterized in that there is provided a sixth line electrically connected to said second line and to said second member adjacent said first power source, a second pair of switch contacts connected between said third line and said second member operable between a first position providing an open connection to said second member and a second position establishing a closed electrical connection to said second member, and that the coil means include a first coil for operating the first pair of switching contacts to their said second position when D C current is passed therethrough in one direction and a second coil connected in series with the first coil for operating said second pair of contacts from their first position to their said second position when D C current is passed therethrough in a second direction that is opposite said one direction, said second pair of contacts providing an open connection to said second member when in their said first position and establishing a closed electrical connection to said second member when in their said second position, and that the second means includes a D C power source and a manually operable reversing switch for selectively connecting the D C power source across the first and second lines for passage of current through the first and second lines in one direction to cause D C current to be passed through said first coil in said one direction and alternately in an opposite direction to cause D C current to be passed through said second coil in said second direction.

11. The apparatus of claim 12 further characterized in that the cooperating means includes a permanent magnet between said coils that aids the field of one coil and partially cancels the effect of the other coil when current is passed through the coils in one direction, said coils being oppositely wound.

12. Electrical apparatus for conducting electrical power from a first power source, one side of which is grounded, to an electrically operated first member that is operable at a location remote from the first source of power and to a second electrically operated member adjacent the first source of power and controlling the energization of the second member from a position adjacent the second member, the electrical apparatus comprising a first and second power line having first ends adapted for connection to the first source of power and second ends adapted for connection to the first member, a ground line having a first end connected to the grounded side of said power source and a second end adapted for connection to the first member, a coil having a first end electrically connected to the grounded side of said first power source and a second end electrically connected to the first end of said ground line, a reed-type switch having a first contact connected to the second line adjacent the power source and a second contact, said reed-type switch being extended through the coil and having said contacts in an open condition when the coil is deenergized, said contacts being movable by the energization of the coil to a closed position, a line electrically connected to the second contact and to the second member and a line electrically connected to the first line adjacent the first power source and to the second member, a second power source, and second means for selectively electrically connecting the second power source to the ground line and first line adjacent the first member to energize said coil, and breaking the electrical connection between the ground line and the second power source, said second means including a switch having a closed position and an open position.

13. Apparatus for remotely controlling a first electrical device from a location adjacent the second electrical device comprising first, second and third conductors, a male connector component attached to one end of said conductors, said male connector component including a prong for each conductor for connection to a grounded primary source of power, a female connector component attached to the other ends of said conductors, said female connector component including a socket for each conductor for connection to the second electrical device, a manually operable switch, an auxiliary source of power, means connecting said switch and auxiliary source of power in series between said first and second conductors adjacent said female connector component, a relay having a coil and a pair of normally open contacts actuatable to a closed position when said coil is energized, said coil being in series with said second conductor adjacent said male connector and one of said contacts being connected to said third conductor adjacent said male connector component, and means near said male connector components for connecting the other of said contacts and said first conductor to said first electrical device.

14. The apparatus of claim 16 further characterized in that said last-mentioned means also provides a connection from the second conductor to said first device.

PO-1050
(5/69)

UNITED STATES PATENT OFFICE
CERTIFICATE OF CORRECTION

Patent No. 3,602,728         Dated  August 31, 1971

Inventor(s) Virgil R. Carpenter

It is certified that error appears in the above-identified patent and that said Letters Patent are hereby corrected as shown below:

Column 1, line 15, "line" should be --(line)--. Column 2, line 2, "and source of power 90 of the second embodiment" should be --(and source of power 90 of the second embodiment)--. Column 3, line 61, the first "183" should be --182--. Column 4, line 42, "not shown" should be --(not shown)--; line 43, "not shown" should be --(not shown)--; line 60, "not shown" should be --(not shown)--; line 60, "reel assembly" should be --(reel assembly)--. Column 5, line 5, "not shown" should be --(not shown)--; line 16, "unwind" should be --(unwind)--; line 18 "winding direction" should be --(winding direction)--. Column 6, lines 18 & 19, "or a switch adjacent to or on the first mentioned machine or tool" should be --(or a switch adjacent to or on the first mentioned machine or tool)--; lines 32 & 33 delete"at least in part forming a part of said line means". Column 7, line 6, "7" second occurrence, should be --6--; line 14, "9" should be --7--; line 18, before "said second position", insert --said first position to their--; line 19, "10" should be --8--; line 20, after the word "operating" insert, --the cooperating--; line 24, "10" should be --8--; line 51, "12" should be --10--. Column 8, line 52, "16" should be --13--.

Signed and sealed this 11th day of April 1972.

(SEAL)
Attest:

EDWARD M. FLETCHER, JR.
Attesting Officer

ROBERT GOTTSCHALK
Commissioner of Patents